(12) United States Patent
Lin et al.

(10) Patent No.: US 11,604,586 B2
(45) Date of Patent: Mar. 14, 2023

(54) DATA PROTECTION METHOD, WITH DISK ARRAY TAGS, MEMORY STORAGE DEVICE AND MEMORY CONTROL CIRCUIT UNIT

(71) Applicant: PHISON ELECTRONICS CORP., Miaoli (TW)

(72) Inventors: Wei Lin, Taipei (TW); Yu-Cheng Hsu, Yilan County (TW); Hsiao-Yi Lin, Yilan County (TW); Yu-Siang Yang, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/921,874

(22) Filed: Jul. 6, 2020

(65) Prior Publication Data

US 2021/0397347 A1  Dec. 23, 2021

(30) Foreign Application Priority Data

Jun. 19, 2020 (TW) .................................. 109120756

(51) Int. Cl.
*G06F 3/06* (2006.01)

(52) U.S. Cl.
CPC ............ *G06F 3/062* (2013.01); *G06F 3/0659* (2013.01); *G06F 3/0679* (2013.01)

(58) Field of Classification Search
CPC ....... G06F 3/062; G06F 3/0679; G06F 3/0659
See application file for complete search history.

(56) References Cited

U.S. PATENT DOCUMENTS

| | | | |
|---|---|---|---|
| 9,251,891 B1* | 2/2016 | Hu ....................... | G11C 11/5642 |
| 2004/0177216 A1 | 9/2004 | Asari et al. | |
| 2012/0023388 A1* | 1/2012 | Liu ...................... | H03M 13/098 714/805 |
| 2014/0089561 A1* | 3/2014 | Pangal ................. | G06F 11/1012 711/103 |
| 2016/0266955 A1* | 9/2016 | Takeda .................... | G06F 12/00 |
| 2018/0067666 A1* | 3/2018 | d'Abreu ................ | G06F 3/0619 |
| 2018/0067684 A1* | 3/2018 | Benisty ............... | G06F 11/1048 |
| 2018/0068701 A1* | 3/2018 | d'Abreu ................... | G11C 8/12 |

(Continued)

FOREIGN PATENT DOCUMENTS

CN    107958687    4/2018

OTHER PUBLICATIONS

"Office Action of China Counterpart Application", dated Dec. 3, 2021, pp. 1-7.

*Primary Examiner* — Sean D Rossiter
(74) *Attorney, Agent, or Firm* — JCIPRNET

(57) ABSTRACT

A data protection method, a memory storage device and a memory control circuit unit are provided. The method includes: setting a plurality of disk array tags corresponding to a plurality of word lines and a plurality of memory planes, and the plurality of disk array tags corresponding to one of the word lines connected to one of the memory planes are at least partially identical to the plurality of disk array tags corresponding to another one of the word lines connected to another one of the memory planes; receiving a write command and data corresponding to the write command from a host system; and sequentially writing the data into the plurality of word lines and the plurality of memory planes corresponding to the plurality of disk array tags.

27 Claims, 5 Drawing Sheets

(56) References Cited

U.S. PATENT DOCUMENTS

| | | | |
|---|---|---|---|
| 2018/0286477 A1* | 10/2018 | Chiu | G11C 11/5628 |
| 2019/0034105 A1* | 1/2019 | Natarajan | G11C 11/56 |
| 2019/0163568 A1* | 5/2019 | Liu | G06F 11/1068 |
| 2019/0347037 A1* | 11/2019 | Chen | G06F 3/0644 |
| 2020/0075114 A1* | 3/2020 | Lin | G11C 29/52 |
| 2021/0200461 A1* | 7/2021 | Muchherla | G06F 3/0679 |

\* cited by examiner

DATA PROTECTION METHOD, WITH DISK ARRAY TAGS, MEMORY STORAGE DEVICE AND MEMORY CONTROL CIRCUIT UNIT

CROSS-REFERENCE TO RELATED APPLICATION

This application claims the priority benefit of Taiwan application serial no. 109120756, field on Jun. 19, 2020. The entirety of the above-mentioned patent application is hereby incorporated by reference herein and made a part of this specification.

BACKGROUND

1. Technology Field

The invention relates to a memory management technique, and more particularly, to a data protection method, a memory storage device and a memory control circuit unit.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In the field of flash memory, a 3D NAND flash memory that encapsulates more memory cells through 3D stacking technology is currently being developed. However, the 3D NAND flash memory may cause physical failures such as short circuit of word lines due to various factors (e.g., memory cell leakage, programming failure, damage, etc.). In general, to ensure the correctness of data, the data stored in multiple physical pages may be encoded to have the same tag in certain encoding/decoding technologies. Data belonging to the same tag can protect each other. When certain data cannot be corrected by its own error correction code, data corresponding to the same tag and stored on other physical pages can be used to assist the correction of the uncorrectable data. For example, parity information stored in the rewritable non-volatile memory corresponding to the data to be corrected can be used to correct the data.

However, the storage space of the rewritable non-volatile memory module is limited. As a memory capacity becomes larger, it may take more buffer memory capacity to store the data corresponding to the temporarily stored tags. In particular, the above situation is even more significant in the 3D NAND flash memory. Therefore, how to maintain the reliability of the stored data while reducing the amount of data corresponding to the stored tags is a subject of concern to those skilled in the art.

SUMMARY

The invention provides a data protection method, a memory storage device and a memory control circuit unit that can provide a favorable data protection capability when the buffer memory capacity is limited.

An embodiment of the invention provides a data protection method for a memory storage device. The memory storage device includes a rewritable non-volatile memory module. The rewritable non-volatile memory module includes a plurality of physical units. Each of the plurality of physical units includes a plurality of physical programming units. Each of the physical programming units corresponds to one of a plurality of word lines and one of a plurality of memory planes. The data protection method includes: setting a plurality of disk array tags corresponding to the plurality of word lines and the plurality of memory planes. The plurality of disk array tags corresponding to one of the plurality of word lines connected to one of the plurality of memory planes are at least partially identical to the plurality of disk array tags corresponding to another one of the plurality of word lines connected to another one of the plurality of memory planes. The disk array tags are used to indicate a protection relationship of the data between the physical programming units corresponding to said one of the word lines connected to said one of the memory planes and the physical programming units corresponding to said another one of the word lines connected to said another one of the memory planes.

An exemplary embodiment of the invention provides a memory storage device. The memory storage device includes a connection interface unit, a rewritable non-volatile memory module and a memory control circuit unit. The connection interface unit is configured to couple to a host system. The rewritable non-volatile memory module includes a plurality of physical units. Each of the plurality of physical units includes a plurality of physical programming units. Each of the physical programming units corresponds to one of a plurality of word lines and one of a plurality of memory planes. The memory control circuit unit is coupled to the connection interface unit and the rewritable non-volatile memory module. The memory control circuit unit is configured to set a plurality of disk array tags corresponding to the plurality of word lines and the plurality of memory planes. The plurality of disk array tags corresponding to one of the plurality of word lines connected to one of the plurality of memory planes are at least partially identical to the plurality of disk array tags corresponding to another one of the plurality of word lines connected to another one of the plurality of memory planes. The memory control circuit unit is further configured to receive a write command and data corresponding to the write command from the host system. The memory control circuit unit is further configured to sequentially write the data into the plurality of word lines and the plurality of memory planes corresponding to the plurality of disk array tags.

An exemplary embodiment of the invention provides a memory control circuit unit for controlling a memory storage device including a rewritable non-volatile memory module. The rewritable non-volatile memory module includes a plurality of physical units. Each of the plurality of physical units includes a plurality of physical programming units. Each of the physical programming units corresponds to one of a plurality of word lines and one of a plurality of memory planes. The memory control circuit unit includes a host interface, a memory interface and a memory management circuit. The host interface is configured to couple to a host system. The memory interface is configured to couple to a rewritable non-volatile memory module. The memory management circuit is coupled to the host interface and the memory interface. The memory management circuit is configured to set a plurality of disk array tags corresponding to the plurality of word lines and the plurality of memory planes. The plurality of disk array tags corresponding to one of the plurality of word lines connected to one of the plurality of memory planes are at least partially identical to the plurality of disk array tags corresponding to another one of the plurality of word lines connected to another one of the plurality of memory planes. The memory management circuit is further configured to receive a write command and data corresponding to the write command from the host system. The memory management circuit is further configured to sequentially write the data into the plurality of word lines and the plurality of memory planes corresponding to the plurality of disk array tags.

Based on the above, the data protection method, the memory storage device and the memory control circuit unit provided by the embodiments of the invention can set multiple disk array tags corresponding to multiple word lines and multiple memory planes through an interleaved arrangement of the disk array tags. In this way, the data of the memory may be protected by using fewer disk array tags when the capacity of the buffer memory is limited, so as to achieve a maximum protection effect.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Figure 1:
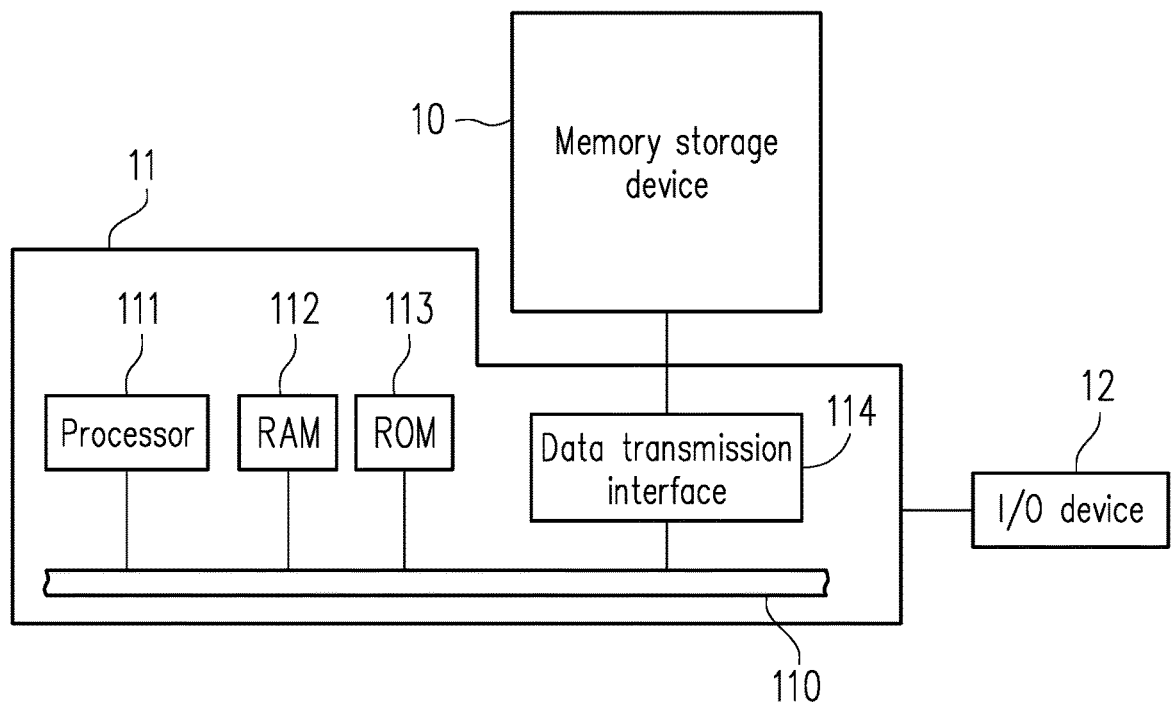
FIG. 1 is a schematic diagram illustrating a host system, a memory storage device and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit unit). The memory storage device is usually configured together with a host system so the host system can write data into the memory storage device or read data from the memory storage device.

Figure 2:
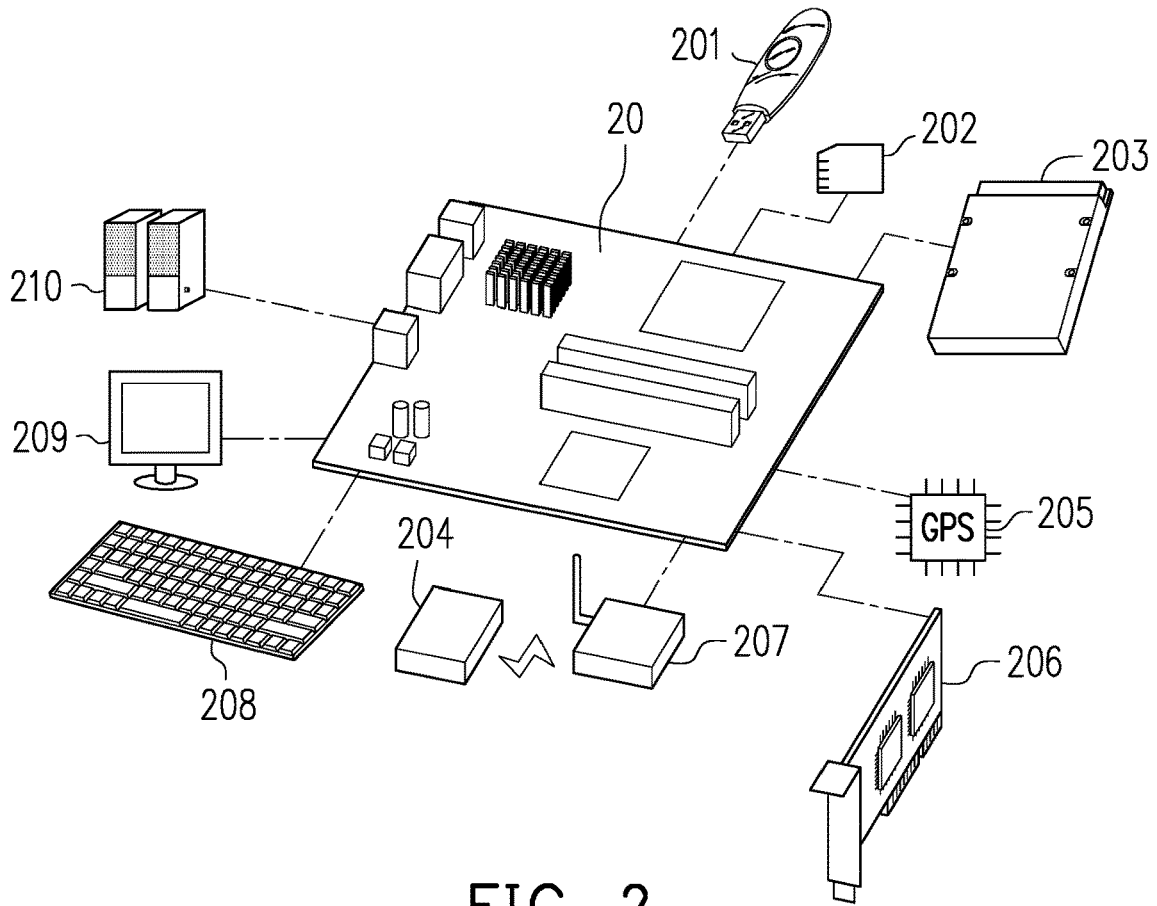
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment. FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
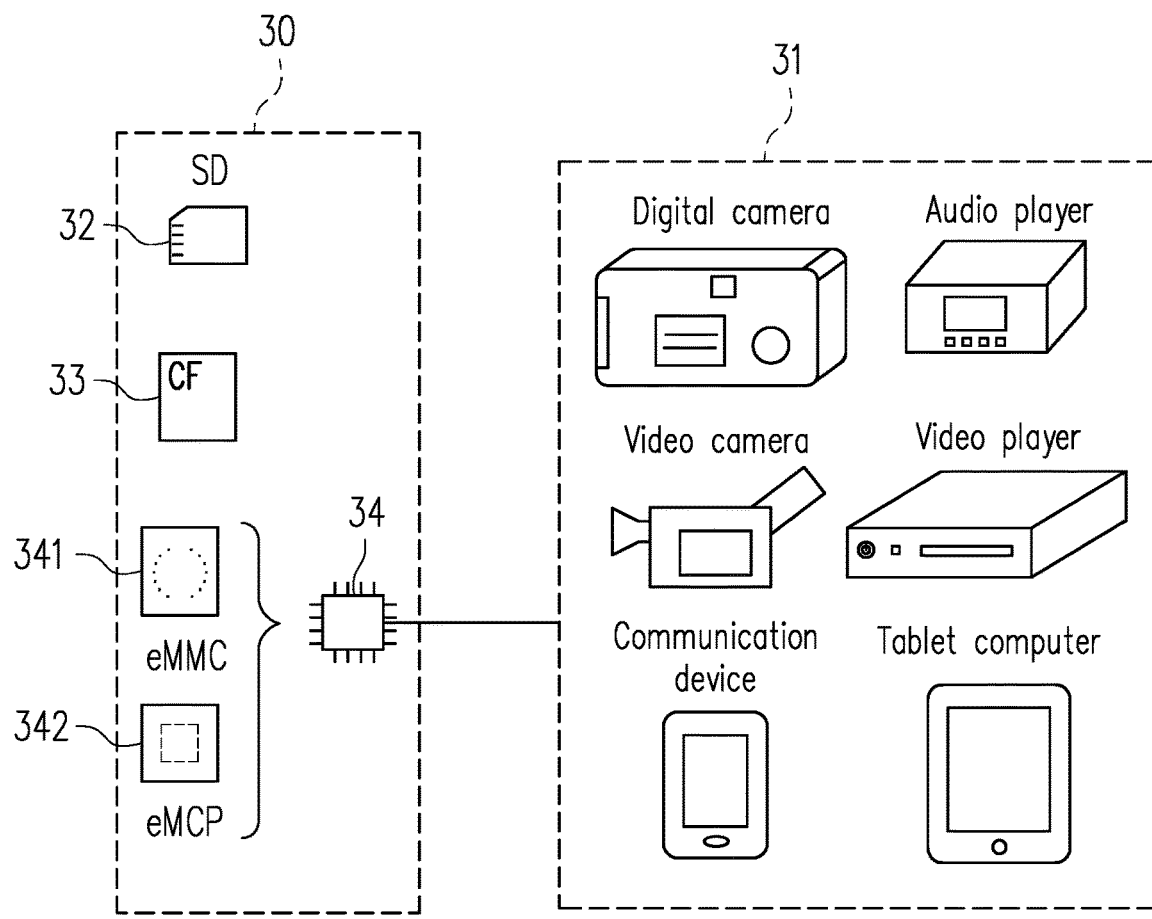
FIG. 3 is a schematic diagram illustrating a host system and a memory storage device according to another exemplary embodiment.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
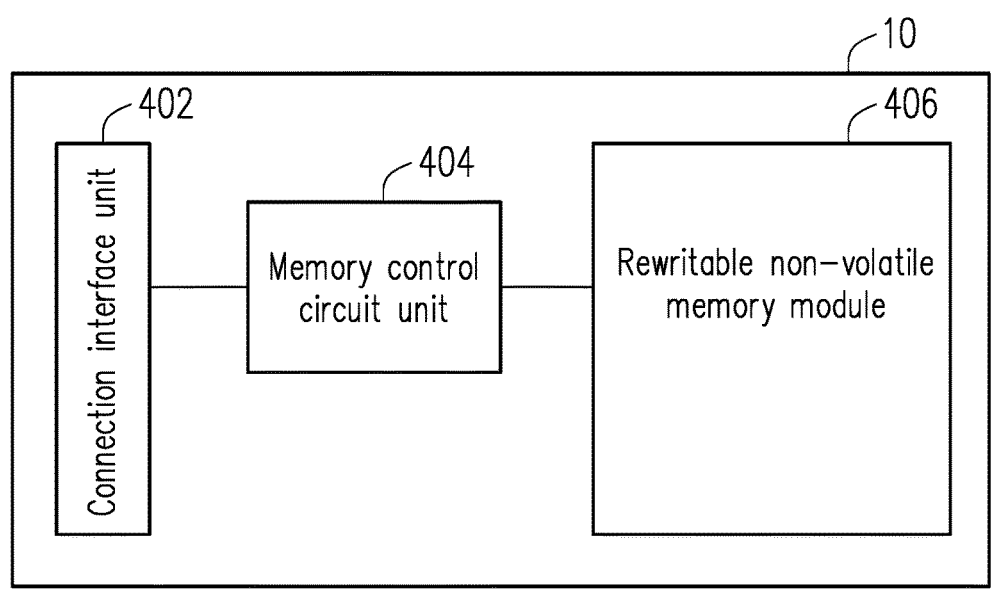
FIG. 4 is a schematic block diagram illustrating a memory storage device according to an exemplary embodiment of the invention.

FIG. 4 is a schematic block diagram illustrating a memory storage device according to an exemplary embodiment of the invention. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In the present exemplary embodiment, the connection interface unit 402 is compatible with a SATA (Serial Advanced Technology Attachment) standard. Nevertheless, it should be understood that the invention is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For example, a LSB (Least Significant Bit) of one memory cell belongs to the lower physical programming unit, and a MSB (most significant bit) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area includes multiple physical sectors configured to store user data, and the redundant bit area is configured to store system data (e.g., management data such as the error correcting code). In the present exemplary embodiment, the data bit area includes 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
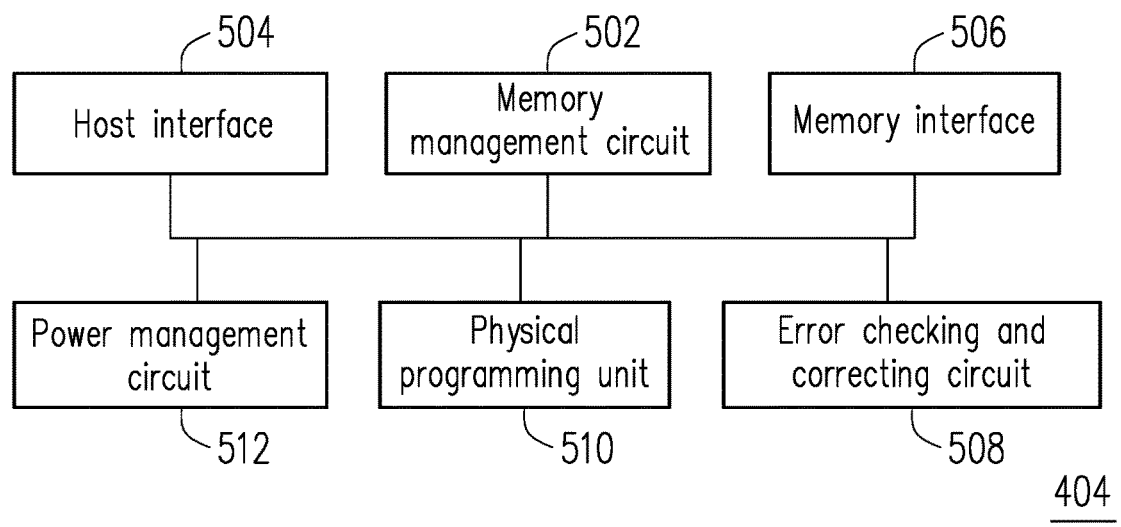
FIG. 5 is a schematic block diagram illustrating a memory control circuit unit according to an exemplary embodiment of the invention.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. During operation of the memory storage device 10, the control commands are executed by the microprocessor to perform operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the invention is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data and the ECC and/or the EDC corresponding to the write command into the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. In this embodiment, the buffer memory 510 includes a parity information buffer, and the parity information buffer is configured to temporarily store parity information. The power management unit 512 is coupled to the memory management circuit 502 and configured to control a power of the memory storage device 10.

In an exemplary embodiment, the rewritable non-volatile memory module 406 of FIG. 4 is also known as a flash memory module, and the memory control circuit unit 404 is also known as a flash memory controller for controlling the flash memory module. In an exemplary embodiment, the memory management circuit 502 of FIG. 5 is also known as a flash memory management circuit.

In this exemplary embodiment, a low density parity code (LDPC) is implemented by the error checking and correcting circuit 508. However, in another exemplary embodiment, the error checking and correcting circuit 508 may also be implemented by encoding/decoding algorithms including a BCH code, a convolutional code, a turbo code, a bit flipping, etc.

Specifically, the memory management circuit 502 generates an error correction code frame (ECC frame) according to the received data and the corresponding error checking and correcting code (a.k.a. an error correction code) and writes the ECC frame into the rewritable non-volatile memory module 406. Then, when the memory management circuit 502 reads data from the rewritable non-volatile memory module 406, the error checking and correcting circuit 508 can verify the correctness of the read data according to the error correction code in the ECC frame.

It should be noted that, operations executed by the memory management circuit 502, the host interface 504, the memory interface 506, the error checking and correcting circuit 508, the buffer memory 510 and the power management circuit 512 in the following description may also be referred to as being executed by the memory control circuit unit 404.

In an exemplary embodiment, the memory storage device 10 includes a plurality of rewritable non-volatile memory modules 406, and the rewritable non-volatile memory module 406 includes a plurality of word lines (WL) and a plurality of memory planes. Further, the word line is connected to multiple memory planes.

The rewritable non-volatile memory modules 406 are divided according to the memory planes in a memory die of the rewritable non-volatile memory modules 406. Specifically, the rewritable non-volatile memory module 406 may include one or more memory dies. Each memory die has one or more memory planes, and each memory plane has a plurality of physical programming units. At the factory, the manufacturer will divide one or more memory planes into one device based on their needs. In this way, the manufacturer can manage the rewritable non-volatile memory modules 406 in units of devices. The invention does not limit the number of memory planes included in each device.

In the present exemplary embodiment, the rewritable non-volatile memory module 406 may also be a 3D (Three Dimension) TLC (Trinary Level Cell) NAND flash memory module (i.e., a flash memory module capable of storing three data bits in one memory cell) or other memory module having the same features. However, the invention is not limited in this regard. The rewritable non-volatile memory module 406 may also be a 3D MLC (Multi Level Cell) NAND flash memory module (i.e., a flash memory module capable of storing two data bits in one memory cell) or other memory module having the same features.

In this exemplary embodiment, the rewritable non-volatile memory module 406 includes a plurality of physical units, and each physical unit includes a plurality of physical programming units. Each physical programming unit corresponds to one word line and one memory plane.

In an exemplary embodiment, when the memory management circuit 502 receives a write command and the corresponding data from the host system 11, the memory management circuit 502 temporarily stores the data into the buffer memory 510, and organizes the data into sub-data strings according to a size of the physical programming unit. Then, the memory management circuit 502 separately and sequentially programs the sub-data strings into the physical programming units.

On the other hand, the memory management circuit 502 generates the parity information for protecting the sub-data strings according to the sub-data strings. In detail, the memory management circuit 502 may determine a disk array tag for corresponding to each parity information according to a preset look-up table or a preset equation. The disk array tags are used to indicate the sub-data strings from which each parity information is obtained through an operation in the parity information buffer. Accordingly, when the sub-data strings are separately and sequentially programmed into the physical programming units, the memory management circuit 502 determines, according to the preset look-up table or the preset equation, to perform a logic operation on the sub-data strings and sub-data strings belonging to the same disk array tag in the parity information buffer, so as to generate the parity information. In an embodiment, the logic operation for generating the parity information is, for example, an XOR operation. Then, after calculating a set of computing units (e.g., a set of the physical units), the memory management circuit 502 programs the parity information into the rewritable non-volatile memory module 406. In particular, the disk array tags set by the memory management circuit 502 may respectively correspond to the memory planes and the physical programming units written with the sub-data strings for calculating the parity information. Based on this, the memory management circuit 502 may use a disk array tag look-up table to record the disk array tags and the memory planes and the physical programming units written with the sub-data strings for calculating the parity information to which the disk array tags correspond, and use another look-up table to record the disk array tags and addresses at which the parity information corresponding to the disk array tags are stored.

Specifically, the memory management circuit 502 sets a plurality of disk array tags corresponding to a plurality of word lines and a plurality of memory planes. The plurality of disk array tags corresponding to one of the word lines connected to one of the memory planes are at least partially identical to the plurality of disk array tags corresponding to another one of the word lines connected to another one of the memory planes. Here, said one of the word lines connected to said one of the memory planes and said another one of the word lines connected to said another one of the memory plane are different memory planes in the rewritable non-volatile memory module 406. The disk array tags are used to indicate a protection relationship of the data between the physical programming units corresponding to said one of the word lines connected to said one of the memory planes and the physical programming units corresponding to said another one of the word lines connected to said another one of the memory planes.

For instance, the memory planes of the memory storage device 10 include a first plane and a second plane. The first plane is connected to a first word line and a second word line, and the second plane is also connected to the first word line and the second word line. The first plane and the second plane respectively correspond to the physical programming units. Part of the physical programming units is composed of a plurality of memory cells connected to the first word line, and part of the physical programming units are composed of a plurality of memory cells connected to the second word line. In this exemplary embodiment, the first word line is connected to the first plane and corresponds a plurality of first disk array tags, and the second word line is connected to the second plane and corresponds to a plurality of second disk array tags. The first disk array tags are at least partially identical to the second disk array tags.

In an exemplary embodiment, the disk array tags corresponding to different word lines connected to the same memory plane are different. In an exemplary embodiment, the disk array tags corresponding to the same word line connected to different memory planes are different.

In more detail, each of the word lines described above is connected to a plurality of physical programming units, and the memory plane includes a plurality of physical programming units. Here, the memory management circuit 502 sets the plurality of disk array tags to be corresponding to the plurality of memory planes and the plurality of physical programming units. The disk array tag looks-up table may record the disk array tag corresponding to each physical programming unit of each memory plane.

Figure 6:
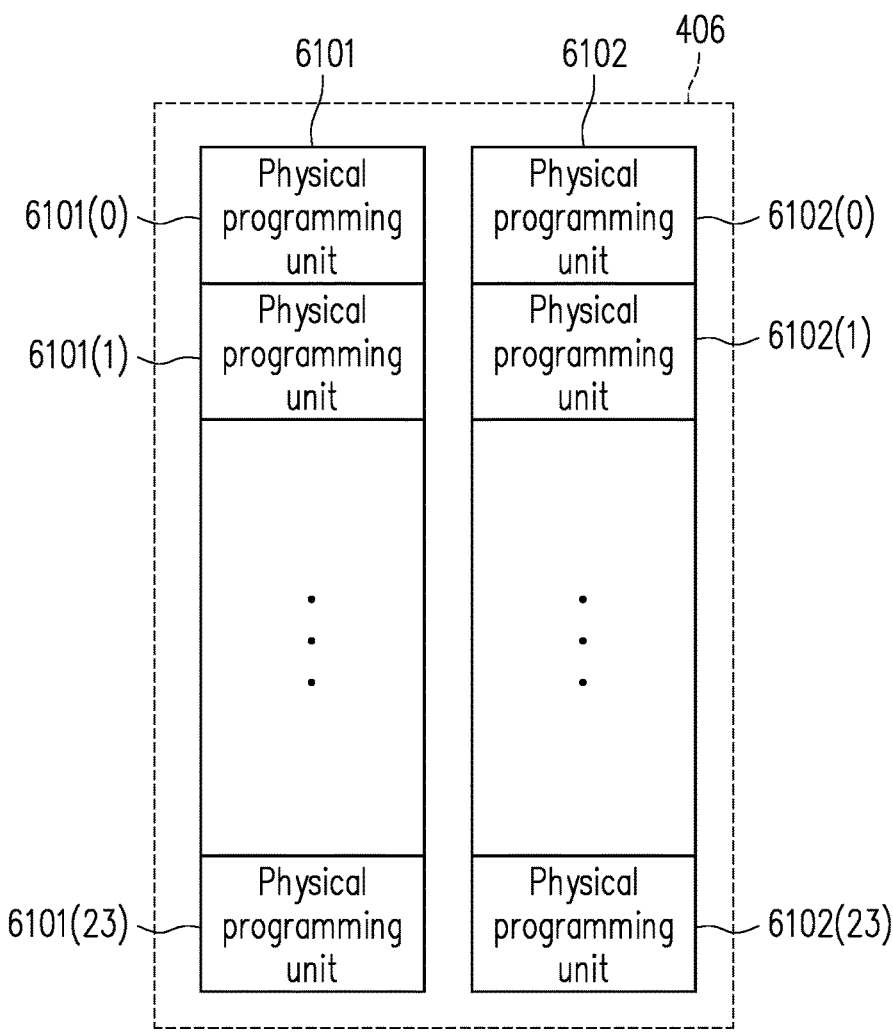
FIG. 6 is a schematic block diagram illustrating a rewritable non-volatile memory module according to an exemplary embodiment of the invention.

FIG. 6 is a schematic block diagram illustrating a rewritable non-volatile memory module according to an exemplary embodiment of the invention. For convenience of description, the present exemplary embodiment takes physical units 6101 and 6102 in FIG. 6 as a set of computing units as an example for description. The physical units 6101 and 6102 respectively include 24 physical programming units. However, the invention does not limit the number of physical programming units.

Figure 7:
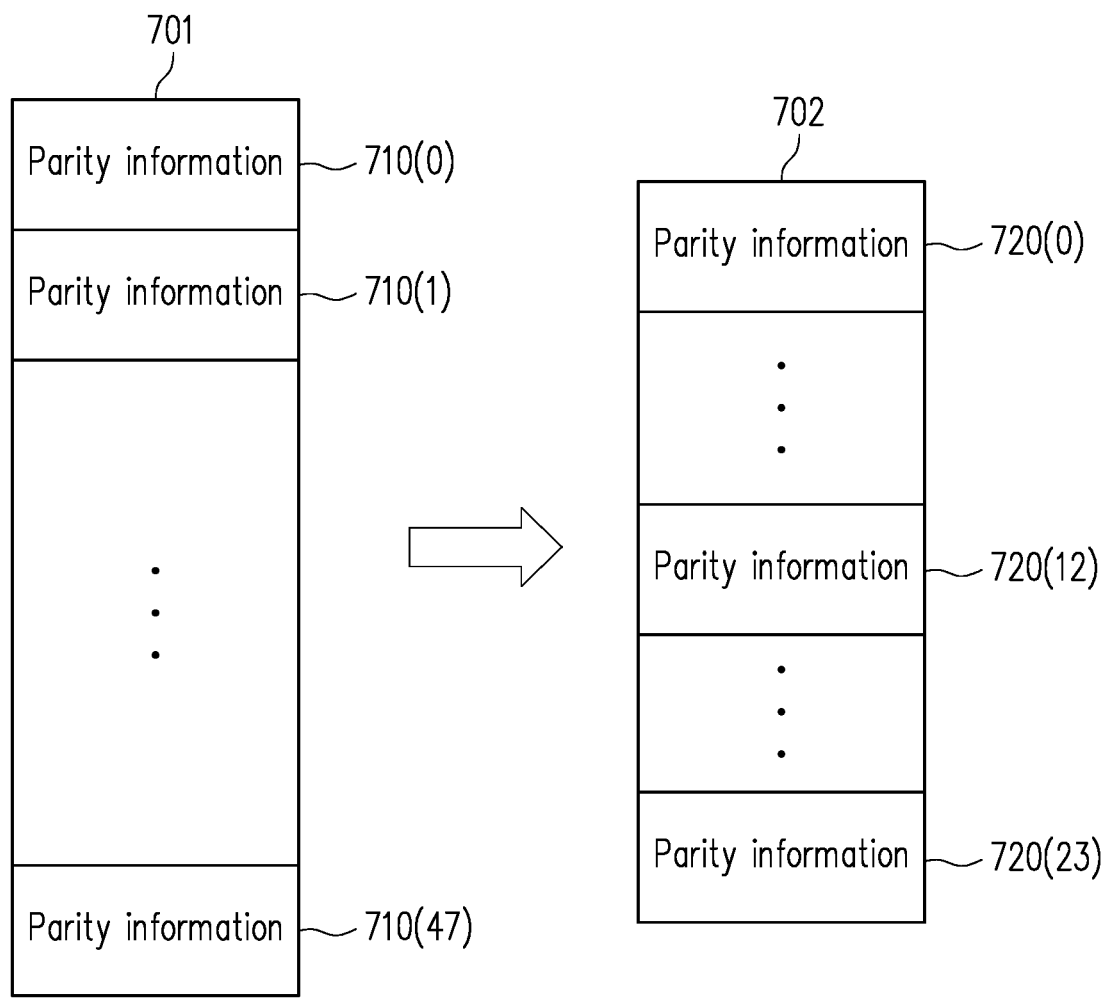
FIG. 7 is a schematic block diagram of a parity information buffer according to an exemplary embodiment of the invention.

FIG. 7 is a schematic block diagram of a parity information buffer according to an exemplary embodiment of the invention. Referring to FIG. 6 and FIG. 7, a storage unit 702 logically belonging to the parity information buffer temporarily stores the parity information, and the parity information may be stored in storage sub-units 720(0) to 720(23) included by the parity information buffer, respectively. When the memory management circuit 502 receives the write command and the corresponding data from the host system 11, the memory management circuit 502 sequentially writes the data corresponding to the write command into physical programming units 6101(0) to 6101(23) and 6102(0) to 6102(23). Here, the data is sequentially written into the physical programming unit according to the order of the physical programming units 6101(0), 6102(0), 6101(1), 6102(1) and so on and so forth, for example. In this exemplary embodiment, the physical programming units 6101(0) to 6101(23) and the physical programming units 6102(0) to 6102(23) correspond to different memory planes.

The data written into the physical programming unit 6101(12) is taken here as an example. When the data is written into the physical programming unit 6101(12), the memory management circuit 502 determines that the physical programming unit 6101(12) corresponds to the storage sub-unit 720(12) of the storage unit 702 according to the preset look-up table or the preset equation, and performs a logic operation on the written data and the parity information stored in the storage sub-unit 720(12). In this exemplary embodiment, the parity information stored in the storage sub-unit 720(12) is determined according to the preset look-up table or the preset equation. The physical programming units corresponding to the same storage sub-unit 720(12) as the physical programming unit 6101(12) include the physical programming unit 6102(0). Then, after calculating the parity information according to the data stored in the physical units 6101 and 6102 (i.e., a set of computing units), the memory management circuit 502 sets disk array tags 0 to 23 corresponding to the parity information stored in the storage sub-units 720(0) to 720(23), and stores the calculated parity information into the rewritable non-volatile memory module 406. In particular, the disk array tags 0 to 23 set by the memory management circuit 502 may respectively correspond to the physical programming units 6101(0) to 6101(23) and 6102(0) to 6102(23) written with the data for calculating the parity information. In this exemplary embodiment, the memory management circuit 502 uses a disk array tag look-up table to record the disk array tags 0 to 23 and the memory planes and the physical programming units 6101(0) to 6101(23) and 6102(0) to 6102(23) written with the data for calculating the parity information to which the disk array tags 0 to 23 correspond, and uses another look-up table to record the disk array tags 0 to 23 and addresses at which the parity information corresponding to the disk array tags 0 to 23 are stored. Here, a correspondence relationship of the disk array tags 0 to 23 to the memory planes and the physical programming units generated in this exemplary embodiment is provided with reference to Table 1 below.

The correspondence relationship of the disk array tags to the memory planes and the physical programming units generated in this exemplary embodiment is as shown in Table 1 below. Referring to FIG. 6 and Table 1 together, in this exemplary embodiment, the memory planes of the memory storage device 10 include a first plane P0 (i.e., a first memory plane) and a second plane P1 (i.e., a second memory plane). The first plane P0 is connected to a first word line WL0 and a second word line WL1, and the second plane P1 is also connected to the first word line WL0 and the second word line WL1. Here, the physical unit 6101 included by the rewritable non-volatile memory module 406 belongs to the first plane P0, whereas the physical unit 6102 belongs to the second plane P1. The first plane P0 and the second plane P1 include the physical programming units 6101(0) to 6101(23) and the physical programming units 6102(0) to 6102(23), respectively. The physical programming units 6101(0) to 6101(11) and 6102(0) to 6102(11) are composed of a plurality of memory cells connected to the first word line WL0, the physical programming units 6101(12) to 6101(23) and 6102(12) to 6102(23) are composed of a plurality of memory cells connected to the second word line WL1, Based on the above architecture, the parity information buffer configured for the 48 physical programming units 6101(0) to 6101(23) and 6102(0) to 6102(23) corresponding to the physical units 6101 and 6102 of the present exemplary embodiment include 24 storages sub-units.

TABLE 1

| Physical unit 6101 Word line (WL) | Physical programming unit (page) | Plane (P0) Tag | Plane (P1) Tag |
|---|---|---|---|
| 0 | 0 | 0 | 12 |
| 0 | 1 | 1 | 13 |
| 0 | 2 | 2 | 14 |
| 0 | 3 | 3 | 15 |
| 0 | 4 | 4 | 16 |
| 0 | 5 | 5 | 17 |
| 0 | 6 | 6 | 18 |

TABLE 1-continued

| Physical unit 6101 Word line (WL) | Physical programming unit (page) | Plane (P0) Tag | Plane (P1) Tag |
|---|---|---|---|
| 0 | 7 | 7 | 19 |
| 0 | 8 | 8 | 20 |
| 0 | 9 | 9 | 21 |
| 0 | 10 | 10 | 22 |
| 0 | 11 | 11 | 23 |
| 1 | 12 | 12 | 0 |
| 1 | 13 | 13 | 1 |
| 1 | 14 | 14 | 2 |
| 1 | 15 | 15 | 3 |
| 1 | 16 | 16 | 4 |
| 1 | 17 | 17 | 5 |
| 1 | 18 | 18 | 6 |
| 1 | 19 | 19 | 7 |
| 1 | 20 | 20 | 8 |
| 1 | 21 | 21 | 9 |
| 1 | 22 | 22 | 10 |
| 1 | 23 | 23 | 11 |

In this exemplary embodiment, the memory management circuit 502 sets the first word line WL0 to be connected to the first plane P0 and corresponding to a plurality of disk array tags (a.k.a. first disk array tags). The memory management circuit 502 sets the second word line WL1 to be connected to the second plane P1 and corresponding to a plurality of disk array tags (a.k.a. second disk array tags). In this exemplary embodiment, the memory management circuit 502 sets the physical programming units 6101(0) to 6101(11) included by the first plane P0 connected to the first word line WL0 to be respectively corresponding to the first disk array tags 0 to 11, and sets the physical programming units 6102(12) to 6102(23) included by the second plane P1 connected to the second word line WL1 to be respectively corresponding to the second disk array tags 0 to 11. On the other hand, the memory control circuit unit 404 sets the physical programming units 6102(0) to 6102(11) included by the second plane P1 connected to the first word line WL0 to be respectively corresponding to the first disk array tags 12 to 23, and sets the physical programming units 6101(12) to 6101(23) included by the first plane P0 connected to the second word line WL1 to be respectively corresponding to the second disk array tags 12 to 23. In other words, in this exemplary embodiment, the disk array tags corresponding to the physical programming units in the same memory plane (the first plane P0 or the second plane P1) connected to the first word line WL0 and the second word line WL1 do not include the same disk array tags.

Based on the above data protection method provided by the invention, even if one single word line connected to different physical planes (e.g., 2P1WL) partially or completely fails, the stored data can still be restored according to the disk array tag technology provided by the invention. On the other hand, even if two consecutive word lines connected to different physical planes (e.g., 1P2WL) partially or completely fails, the stored data can still be restored according to the disk array tag technology provided by the invention. Compared with to the conventional art where only one of the physical failures can be protected, the data protection provided by the embodiments of the invention can protect aforesaid two cases at the same time. In addition, with the physical units 6101 and 6102 of the embodiments of the invention respectively including 24 physical programming units taken as example, when the two physical failures of 2P1WL and 1P2WL are to be protected at the same time with the conventional parity data recovery technology, it requires 48 disk array tags corresponding to a total of 48 physical programming units in physical units 6101 and 6102 and corresponding temporary storage space (e.g., the storage sub-units 710(0) to 710(47) included by the storage unit 701 shown in FIG. 7) to store temporary data. This is because only one physical programming unit can fail in a set of the physical units corresponding to a set of parity information buffer in the past. In comparison, the data protection method provided by the invention requires only half of those disk array tags and the corresponding temporary storage space to simultaneously protect the two physical failures of 2P1WL and 1P2WL, thereby saving the temporary storage space. It should be noted that, persons with ordinary skill in the art should know how to use the parity information to restore the stored data, and thus details regarding the same are not repeated hereinafter.

Figure 8:
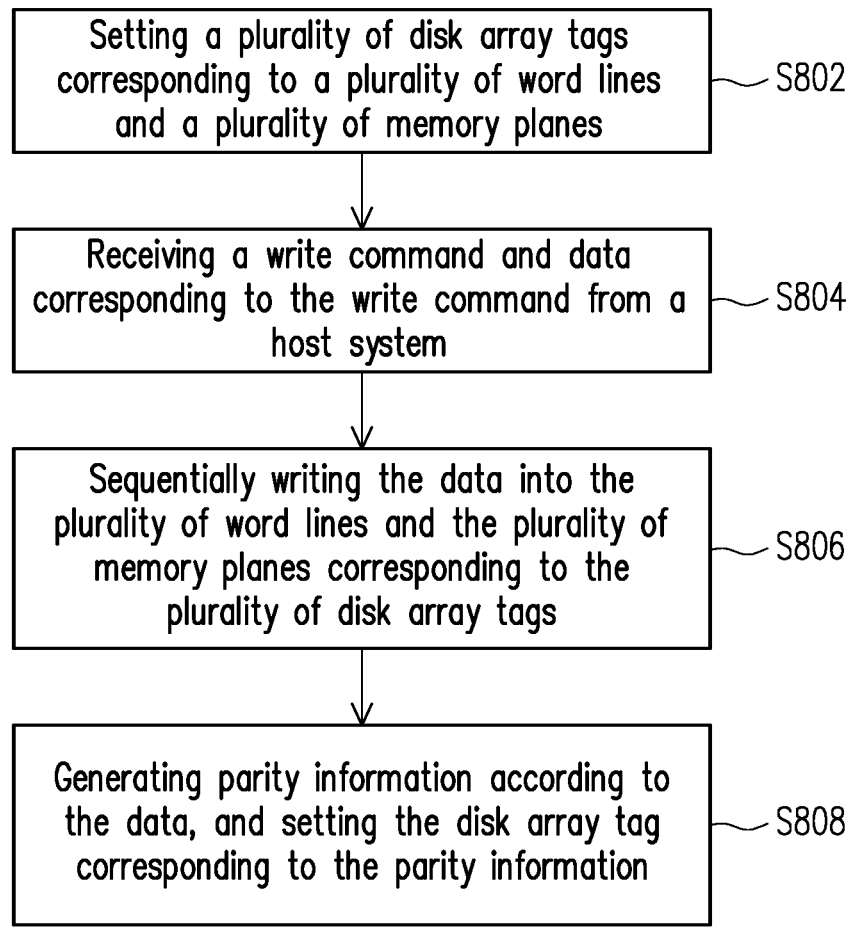
FIG. 8 is a flowchart illustrating a data protection method according to an exemplary embodiment of the invention.

FIG. 8 is a flowchart illustrating a data protection method according to an exemplary embodiment of the invention. In step S802, a plurality of disk array tags corresponding to a plurality of word lines and a plurality of memory planes are set. In step S804, a write command and data corresponding to the write command are received from a host system. In step S806, the data are sequentially written into the plurality of word lines and the plurality of memory planes corresponding to the plurality of disk array tags. In step S808, parity information are generated according to the data, and the disk array tag is set corresponding to the parity information.

It should be noted that, the steps depicted in FIG. 8 may be implemented as a plurality of program codes or circuits, which are not particularly limited in the invention. Moreover, the method disclosed in FIG. 8 may be implemented by reference with above exemplary embodiments, or may be implemented separately, which are not particularly limited in the invention.

In summary, the data protection method, the memory storage device and the memory control circuit unit provided by the embodiments of the invention can set multiple disk array tags corresponding to multiple word lines and multiple memory planes. In this way, the data of the memory may be protected by using fewer disk array tags when the capacity of the buffer memory is limited, so as to achieve a maximum protection effect.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A memory protection method for a memory storage device, the memory storage device comprising a rewritable non-volatile memory module, the rewritable non-volatile memory module comprising a plurality of physical units, each of the plurality of physical units comprising a plurality of physical programming units, each of the physical programming units corresponding to one of a plurality of word lines and one of a plurality of memory planes, the data protection method comprising:

receiving a write command and write data corresponding to the write command from a host system;

wherein the write data comprises a plurality of sub-data strings;

sequentially writing the sub-data strings into the plurality of word lines connected to the plurality of memory planes and performing a logic operation on a first sub-data string and a second sub-data string among the sub-data strings to generate first parity information; and setting a plurality of disk array tags corresponding to the plurality of word lines connected to the plurality of memory planes, wherein first disk array tag corresponding to one of the plurality of word lines connected to one of the plurality of memory planes where the first sub-data string is stored and another one of the disk array tags corresponding to one of the plurality of word lines connected to one of the plurality of memory planes where the second sub-data string is stored, wherein the first disk array tag is used to indicate that the first sub-data string and the second sub-data string are both corresponding to the first parity information;

wherein the plurality of disk array tags corresponding to one of the plurality of word lines connected to one of the plurality of memory planes are at least partially identical to the plurality of disk array tags corresponding to another one of the plurality of word lines connected to another one of the plurality of memory planes.

2. The data protection method of claim 1, wherein the plurality of memory planes comprise a first plane and a second plane, wherein the first plane is connected to a first word line and a second word line in the plurality of word lines, and the second plane is connected to the first word line and the second word line, wherein the first word line is connected to the first plane and corresponding to a plurality of first disk array tags, and the second word line is connected to the second plane and corresponding to a plurality of second disk array tags, wherein the plurality of first disk array tags are at least partially identical to the plurality of second disk array tags.

3. The data protection method of claim 1, wherein the plurality of disk array tags corresponding to different ones of the plurality of word lines connected to a same one of the plurality of memory planes are different.

4. The data protection method of claim 1, wherein the plurality of disk array tags corresponding to a same one of the plurality of word lines connected to different ones of the plurality of memory planes are different.

5. The data protection method of claim 1, wherein the step of setting the plurality of disk array tags corresponding to the plurality of word lines connected to the plurality of memory planes comprises:

setting the plurality of disk array tags corresponding to the plurality of memory planes and the plurality of physical programming units.

6. The data protection method of claim 1, wherein the method further comprises:

setting the disk array tag corresponding to the parity information.

7. The data protection method of claim 6, wherein the step of setting the disk array tag corresponding to the parity information comprises:

setting the disk array tags corresponding to the parity information to be corresponding to the plurality of memory planes and the plurality of physical programming units written with the data for calculating the parity information.

8. The data protection method of claim 1, wherein the plurality of memory planes comprise a first plane and a second plane, wherein the first plane is connected to a first word line and a second word line in the plurality of word lines, and the second plane is connected to the first word line and the second word line, wherein the first word line is connected to the first plane and corresponding to a plurality of first disk array tags, and the second word line is connected to the second plane and corresponding to a plurality of second disk array tags, wherein an order of the plurality of first disk array tags is the same or different from the order of the plurality of second disk array tags.

9. The data protection method of claim 1, wherein the plurality of memory planes comprise a first plane and a second plane, wherein the first plane is connected to a first word line and a second word line in the plurality of word lines, and the second plane is connected to the first word line and the second word line, wherein the first word line is connected to the first plane and corresponding to a plurality of first disk array tags, and the second word line is connected to the second plane and corresponding to a plurality of second disk array tags, wherein the plurality of first disk array tags are identical to the plurality of second disk array tags.

10. A memory storage device, comprising:

a connection interface unit, configured to couple to a host system;

a rewritable non-volatile memory module, wherein the rewritable non-volatile memory module comprises a plurality of physical units, each of the plurality of physical units comprising a plurality of physical programming units, each of the physical programming units corresponding to one of a plurality of word lines and one of a plurality of memory planes; and a memory control circuit unit, coupled to the connection interface unit and the rewritable non-volatile memory module, wherein the memory control circuit unit is configured to receive a write command and write data corresponding to the write command from a host system, wherein the write data comprises a plurality of sub-data strings, the memory control circuit unit is further configured to sequentially write the sub-data strings into the plurality of word lines connected to the plurality of memory planes and perform a logic operation on a first sub-data string and a second sub-data string among the sub-data strings to generate first parity information, and the memory control circuit unit is further configured to set a plurality of disk array tags corresponding to the plurality of word lines connected to the plurality of memory planes, wherein first disk array tag corresponding to one of the plurality of word lines connected to one of the plurality of memory planes where the first sub-data string is stored and another one of the disk array tags corresponding to one of the plurality of word lines connected to one of the plurality of memory planes where the second sub-data string is stored, wherein the first disk array tag is used to indicate that the first sub-data string and the second sub-data string are both corresponding to the first parity information;

wherein the plurality of disk array tags corresponding to one of the plurality of word lines connected to one of the plurality of memory planes are at least partially identical to the plurality of disk array tags corresponding to another one of the plurality of word lines connected to another one of the plurality of memory planes.

11. The memory storage device of claim 10, wherein the plurality of memory planes comprise a first plane and a second plane, wherein the first plane is connected to a first word line and a second word line in the plurality of word lines, and the second plane is connected to the first word line and the second word line, wherein the memory control circuit unit is further configured to set the first word line to be connected to the first plane and corresponding to a plurality of first disk array tags, and set the second word line to be connected to the second plane and corresponding to a plurality of second disk array tags, wherein the plurality of first disk array tags are at least partially identical to the plurality of second disk array tags.

12. The memory storage device of claim 10, wherein the plurality of disk array tags corresponding to different ones of the plurality of word lines connected to a same one of the plurality of memory planes are different.

13. The memory storage device of claim 10, wherein the plurality of disk array tags corresponding to a same one of the plurality of word lines connected to different ones of the plurality of memory planes are different.

14. The memory storage device of claim 10, wherein the operation that the memory control circuit unit is configured to set the plurality of disk array tags corresponding to the plurality of word lines connected to the plurality of memory planes comprises:

the memory control circuit unit is further configured to set the plurality of disk array tags corresponding to the plurality of memory planes and the plurality of physical programming units.

15. The memory storage device of claim 10, wherein the memory control circuit unit is further configured to set the disk array tag corresponding to the parity information.

16. The memory storage device of claim 15, wherein the memory control circuit unit is further configured to set the disk array tag corresponding to the parity information to be corresponding to the plurality of memory planes and the plurality of physical programming units written with the data for calculating the parity information.

17. The memory storage device of claim 10, wherein the plurality of memory planes comprise a first plane and a second plane, wherein the first plane is connected to a first word line and a second word line in the plurality of word lines, and the second plane is connected to the first word line and the second word line, wherein the memory control circuit unit is further configured to set the first word line to be connected to the first plane and corresponding to a plurality of first disk array tags, and set the second word line to be connected to the second plane and corresponding to a plurality of second disk array tags, wherein an order of the plurality of first disk array tags is the same or different from the order of the plurality of second disk array tags.

18. The memory storage device of claim 10, wherein the plurality of memory planes comprise a first plane and a second plane, wherein the first plane is connected to a first word line and a second word line in the plurality of word lines, and the second plane is connected to the first word line and the second word line, wherein the memory control circuit unit is further configured to set the first word line to be connected to the first plane and corresponding to a plurality of first disk array tags, and set the second word line to be connected to the second plane and corresponding to a plurality of second disk array tags, wherein the plurality of first disk array tags are identical to the plurality of second disk array tags.

19. A memory control circuit unit for controlling a memory storage device comprising a rewritable non-volatile memory module, wherein the rewritable non-volatile memory module comprises a plurality of physical units, each of the plurality of physical units comprising a plurality of physical programming units, each of the physical programming units corresponding to one of a plurality of word lines and one of a plurality of memory planes, the memory control circuit unit comprising:

a host interface, configured to couple to a host system, a memory interface, configured to couple to the rewritable non-volatile memory module; and a memory management circuit, coupled to the host interface and the memory interface;

wherein the memory management circuit is configured to receive a write command and write data corresponding to the write command from a host system, wherein the write data comprises a plurality of sub-data strings, the memory management circuit is further configured to sequentially write the sub-data strings into the plurality of word lines connected to the plurality of memory planes and perform a logic operation on a first sub-data string and a second sub-data string among the sub-data strings to generate first parity information, and the memory management circuit is further configured to set a plurality of disk array tags corresponding to the plurality of word lines connected to the plurality of memory planes, wherein first disk array tag corresponding to one of the plurality of word lines connected to one of the plurality of memory planes where the first sub-data string is stored and another one of the disk array tags corresponding to one of the plurality of word lines connected to one of the plurality of memory planes where the second sub-data string is stored, wherein the first disk array tag is used to indicate that the first sub-data string and the second sub-data string are both corresponding to the first parity information;

wherein the plurality of disk array tags corresponding to one of the plurality of word lines connected to one of the plurality of memory planes are at least partially identical to the plurality of disk array tags corresponding to another one of the plurality of word lines connected to another one of the plurality of memory planes.

20. The memory control circuit unit of claim 19, wherein the plurality of memory planes comprise a first plane and a second plane, wherein the first plane is connected to a first word line and a second word line in the plurality of word lines, and the second plane is connected to the first word line and the second word line, wherein the memory management circuit is further configured to set the first word line to be connected to the first plane and corresponding to a plurality of first disk array tags, and set the second word line to be connected to the second plane and corresponding to a plurality of second disk array tags, wherein the plurality of first disk array tags are at least partially identical to the plurality of second disk array tags.

21. The memory control circuit unit of claim 19, wherein the plurality of disk array tags corresponding to different ones of the plurality of word lines connected to a same one of the plurality of memory planes are different.

22. The memory control circuit unit of claim 19, wherein the plurality of disk array tags corresponding to a same one of the plurality of word lines connected to different ones of the plurality of memory planes are different.

23. The memory control circuit unit of claim 19, wherein the operation that the memory management circuit unit is configured to set the plurality of disk array tags corresponding to the plurality of word lines connected to the plurality of memory planes comprises:

the memory management circuit is further configured to set the plurality of disk array tags corresponding to the plurality of memory planes and the plurality of physical programming units.

24. The memory control circuit unit of claim 19, wherein the memory management circuit is further configured to set the disk array tag corresponding to the parity information.

25. The memory control circuit unit of claim 24, wherein the memory management circuit is further configured to set the disk array tag corresponding to the parity information to be corresponding to the plurality of memory planes and the plurality of physical programming units written with the data for calculating the parity information.

26. The memory control circuit unit of claim 19, wherein the plurality of memory planes comprise a first plane and a second plane, wherein the first plane is connected to a first word line and a second word line in the plurality of word lines, and the second plane is connected to the first word line and the second word line, wherein the memory management circuit is further configured to set the first word line to be connected to the first plane and corresponding to a plurality of first disk array tags, and set the second word line to be connected to the second plane and corresponding to a plurality of second disk array tags, wherein an order of the plurality of first disk array tags is the same or different from the order of the plurality of second disk array tags.

27. The memory control circuit unit of claim 19, wherein the plurality of memory planes comprise a first plane and a second plane, wherein the first plane is connected to a first word line and a second word line in the plurality of word lines, and the second plane is connected to the first word line and the second word line, wherein the memory management circuit is further configured to set the first word line to be connected to the first plane and corresponding to a plurality of first disk array tags, and set the second word line to be connected to the second plane and corresponding to a plurality of second disk array tags, wherein the plurality of first disk array tags are identical to the plurality of second disk array tags.

* * * * *